Dec. 19, 1939.　　H. L. ROSENTHAL ET AL　　2,184,084
TRAILER IMPLEMENT
Filed Oct. 31, 1938　　3 Sheets-Sheet 1
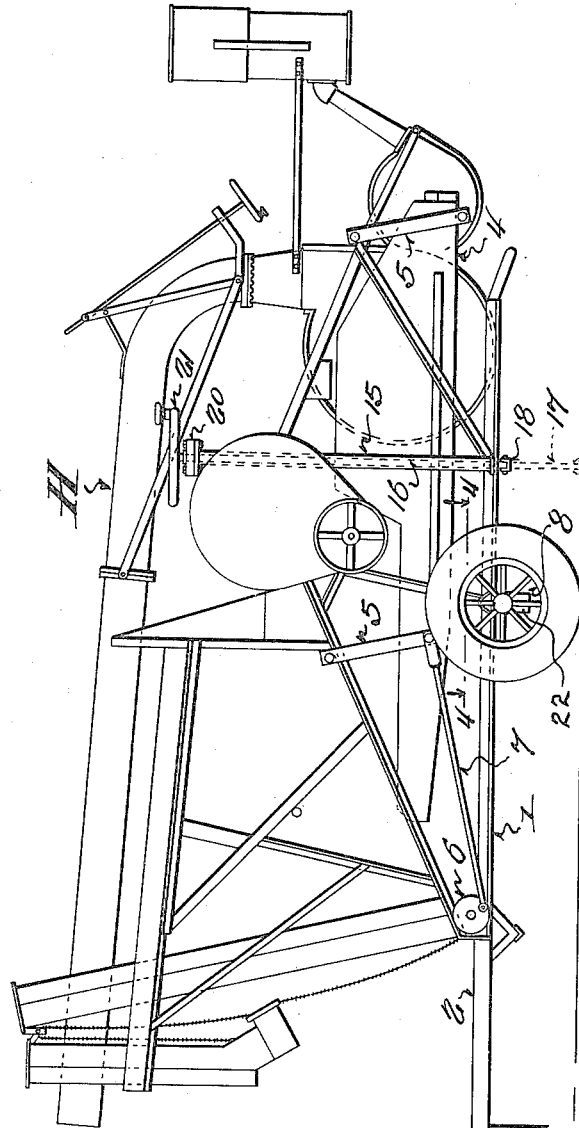
Fig.1.
Inventors
Henry L. Rosenthal and August Rosenthal.
By 
Attorneys.

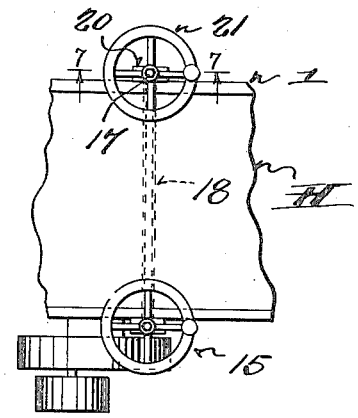
Fig. 3.
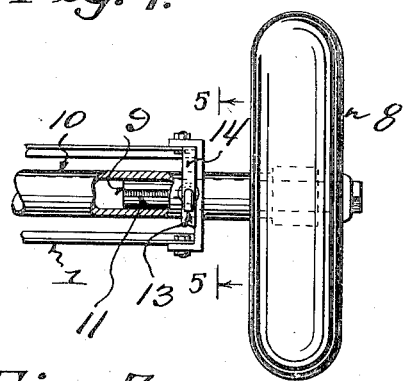
Fig. 4.
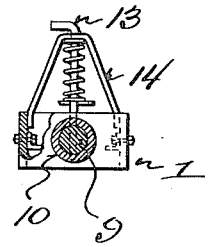
Fig. 5.
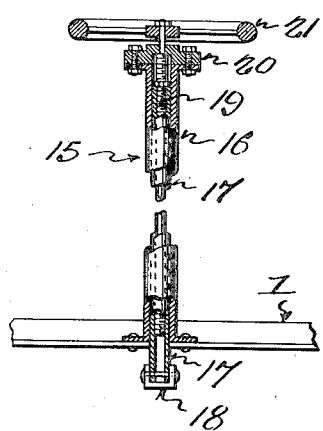
Fig. 7.
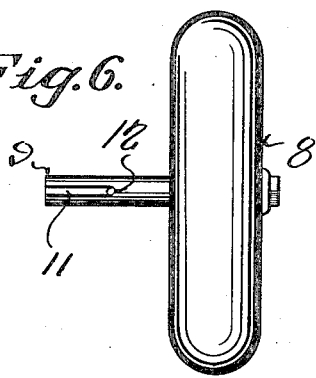
Fig. 6.
Inventors
Henry L. Rosenthal and
August Rosenthal
By 
Attorneys.

Patented Dec. 19, 1939

2,184,084

UNITED STATES PATENT OFFICE 2,184,084

TRAILER IMPLEMENT

Henry L. Rosenthal and August Rosenthal, Wauwatosa, Wis., assignors to Rosenthal Manufacturing Co., West Allis, Wis.

Application October 31, 1938, Serial No. 237,902

2 Claims. (Cl. 130—5)

This invention pertains generally to trailer implements, and more particularly to a trailer carried corn husker or similar apparatus, incorporating reciprocative mechanism setting up high vibration during operation.

For the purpose of explanation, the invention is illustrated, and will be described, as applied to a corn husker, although the principles thereof may be applied to other equipment, such as threshers, vibrating screens, and the like, in which excessive vibration is developed during operation.

In conventional corn huskers, of the well-known "Rosenthal" type, a rapidly reciprocated shaker trough is employed for conveying husks and stalks from the stripping and husking rolls, and obviously, during operation, considerable vibration is set up in the machine. Consequently, the apparatus, which is belt-driven by a tractor, or stationary source of power, must be securely supported and anchored to prevent creeping or movement relative to the sorce of power.

Due to the fact that any trailer carried implement must be equipped with pneumatic tires for rapid transportation, the vibration problem during operation is materially increased, over a solid wheel supported implement, which can be transported only at comparatively slow speed.

Incidental to the foregoing, a more specific object of the present invention resides in the provision of a trailer implement, normally supported upon quickly detachable pneumatic tired wheels, and provided with jacks for supporting the frame during removal and attachment of the pneumatic tired wheels.

A further object resides in the novel structure provided for quick detachment of the supporting wheels.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 1 is a side elevation of one type of trailer implement, embodying the principles of the present invention, shown in transporting condition.

Figure 3 is a fragmentary plan view taken on the line 3—3 of Figure 2.

Figure 4 is a fragmentary detail taken on the line 4—4 of Figure 1, with parts broken away and in section.

Figure 5 is a sectional view taken on the line 5—5 of Figure 4.

Figure 6 is a detail of the detachable stub axle and pneumatic tired wheel employed; and Figure 7 is a detail view of the jack mechanism employed, parts being broken away and in section.

Figure 2:
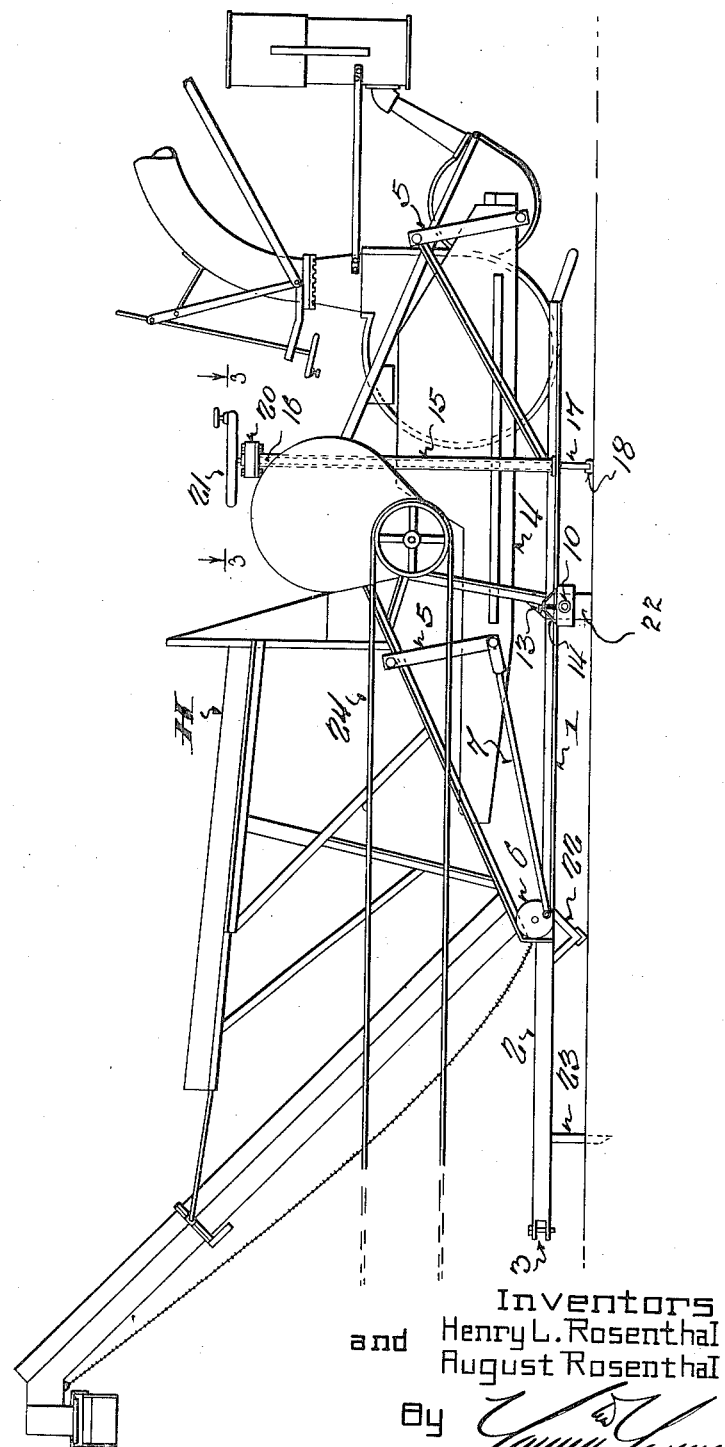
Figure 2 is a similar view illustrating the implement in operative position.

Referring now more particularly to the accompanying drawings, the numeral 1 designates a main frame of a trailer chassis, provided with a draw bar 2 for connection with a motor vehicle, by means of the clevis 3. Supported upon the chassis 1 is a conventional corn husker, designated generally by the letter H, and comprising a reciprocative shaker trough 4 supported by the links 5 connected to the frame of the husker H. The shaker trough 4 is reciprocated by a crank wheel 6, and pitman 7.

Normally, the chassis 1 is supported by a pair of pneumatic tired wheels 8 secured to stub axles 9, which are locked within a transverse tubular sleeve 10 suitably secured to the chassis frame.

For the purpose of quick detachment of the pneumatic tired wheels 8, the stub axles 9 are provided on their inner ends with longitudinal grooves 11, communicating with a transverse bore 12, for reception of a spring-urged locking pin 13 carried by a bracket 14 connected to a portion of the chassis frame 1.

In order to remove the pneumatic tired wheels 8, and permit subsequent support of the chassis upon the ground, as shown in Figure 2, a pair of jacks 15 are connected to the chassis and husker frame upon opposite sides of the machine rearwardly of the supporting wheels. The jacks 15 comprise tubular members 16 in which internally threaded sleeves 17 are slidably mounted, and are connected at their lower ends by a transverse channel foot 18. Threaded shafts 19, journaled in the caps 20 secured to the top of the tubes 16, are provided with hand-wheels 21 for actuating the sleeves 17 to project and retract the same within the tubes 16.

The chassis 1, adjacent its front end, is provided with a supporting foot 22 for engagement with the ground when the supporting wheels are removed and the chassis is lowered to operative position, as shown in Figure 2, and inasmuch as the vibration set up in the machine during operation is longitudinal, the draw bar 2 is provided with a prong 23 for projection into the ground to further anchor the chassis against longitudinal movement.

When the wheels 8 are removed, and the machine is lowered to its operative position by means of the jacks 15, the rear end of the chassis is supported by depending legs 22 carried by the chassis frame adjacent the stub axles. This insures a rigid mounting for the machine during operation, and eliminates the necessity of heavy jacks, which would be required were the same to be used as supports during operation.

From the foregoing explanation, considered in connection with the accompanying drawings the operation of the present invention will be readily apparent, in that the trailer chassis is normally supported upon the pneumatic tired wheels 8, as shown in Figure 1, for the purpose of rapid transportation. In the present instance a single pair of wheels are positioned centrally of the implement to balance the same upon its support, thus relieving weight upon the traction vehicle.

When it is desired to set the implement for operation, the jacks 15 are actuated by means of the hand-wheels 21 to project the sleeves 17, causing the foot 18 to engage the ground and raise the chassis, after which the pins 13 are withdrawn to release the stub axles 9 and permit removal of the supporting wheels. The jacks 15 are then operated to lower the rear end of the chassis to the position as shown in Figure 2, and upon detachment of the draw bar 2 from the traction vehicle, the front end of the chassis is supported upon the foot 22, while the prong 23 enters the ground to anchor the frame against longitudinal movement with relation to the tractor or other source of power, which operates the implement through the belt drive 24 shown in Figure 2.

The advantages of the present invention reside in the fact that the implement can be rapidly transported over the high-ways, and quickly converted for rigid support upon the ground during operation.

We claim:

1. In a mobile implement including a frame, an axle, supporting wheels for the frame, means detachably connecting the wheels to the axle, and a power-driven shaker element on said frame tending to impart longitudinal vibration to the frame and creeping action to the implement; of means for supporting the frame on the ground independent of said wheels when the implement is stationary and when the shaker element is in use, including jacks mounted upon the frame adjacent to the axle for initially raising the frame whereby to permit easy removal of the wheels from the frame, feet on the axle for supporting the frame from the ground when the jacks are lowered, and a V-shaped supporting foot adjacent to the front of the frame and in spaced relation to the feet for engaging the ground and supporting the frame in conjunction with the feet.

2. In a mobile implement including a frame, an axle, supporting wheels for the frame, means detachably connecting the wheels to the axle, and a power-driven shaker element on said frame tending to impart longitudinal vibration to the frame and creeping action to the implement; of means for supporting the frame on the ground independent of said wheels when the implement is stationary and when the shaker element is in use, including jacks mounted upon the frame adjacent to the axle for initially raising the frame whereby to permit easy removal of the wheels from the frame, feet on the axle for supporting the frame from the ground when the jacks are lowered, a V-shaped supporting foot adjacent to the front of the frame and in spaced relation to the feet for engaging the ground and supporting the frame in conjunction with the feet, and a depending prong on the frame for digging into the ground.

HENRY L. ROSENTHAL.
AUGUST ROSENTHAL.